(No Model.) 3 Sheets—Sheet 1.

J. McCREERY.
VENTILATOR VALVE FOR SHIPS.

No. 592,531. Patented Oct. 26, 1897.

Witnesses
F. L. Ourand
George J. Weber

Joseph McCreery,
per W. H. Singleton,
Attorney

Inventor

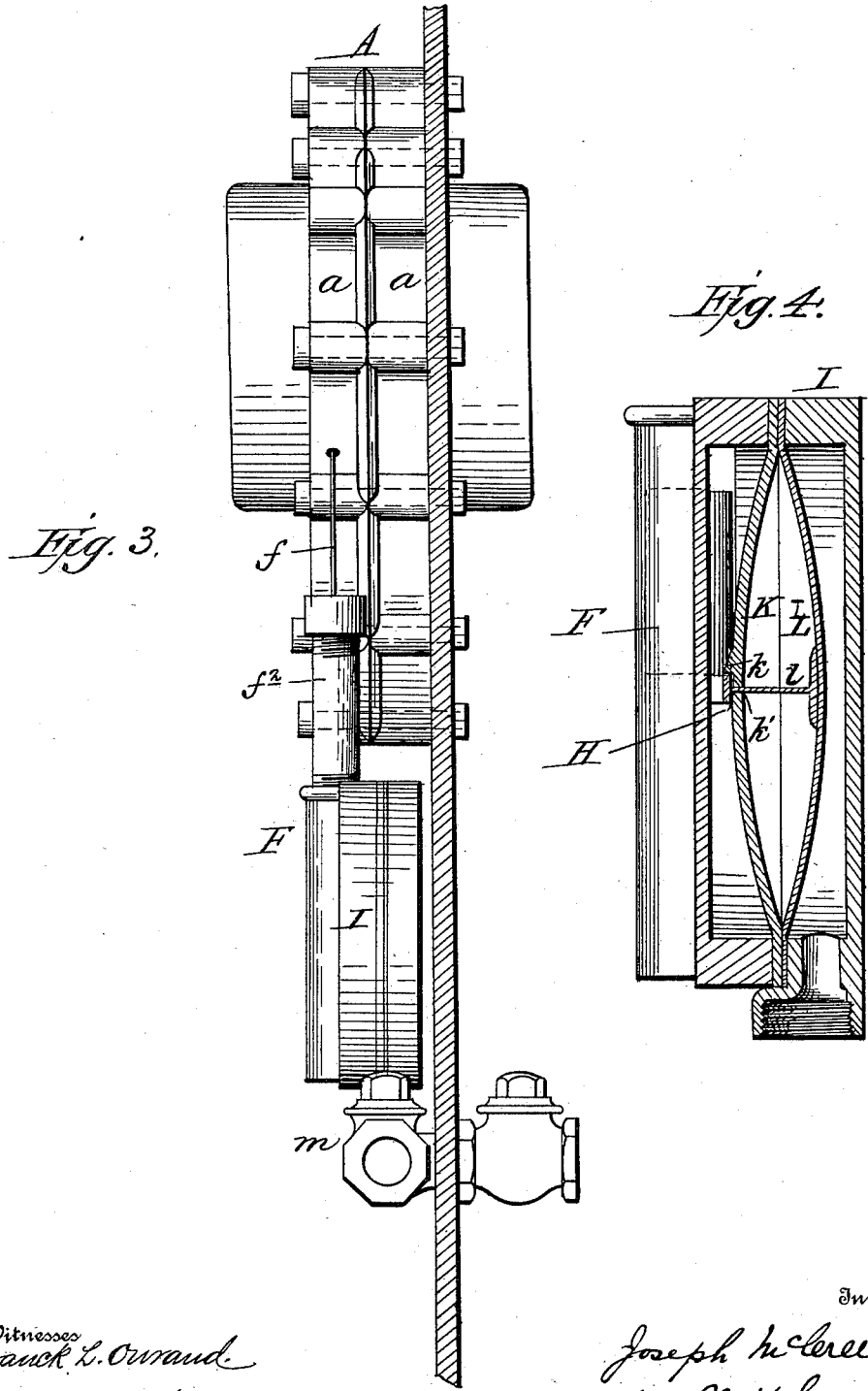

(No Model.)  
3 Sheets—Sheet 3.
J. McCREERY.
VENTILATOR VALVE FOR SHIPS.
No. 592,531. Patented Oct. 26, 1897.
Fig. 5.
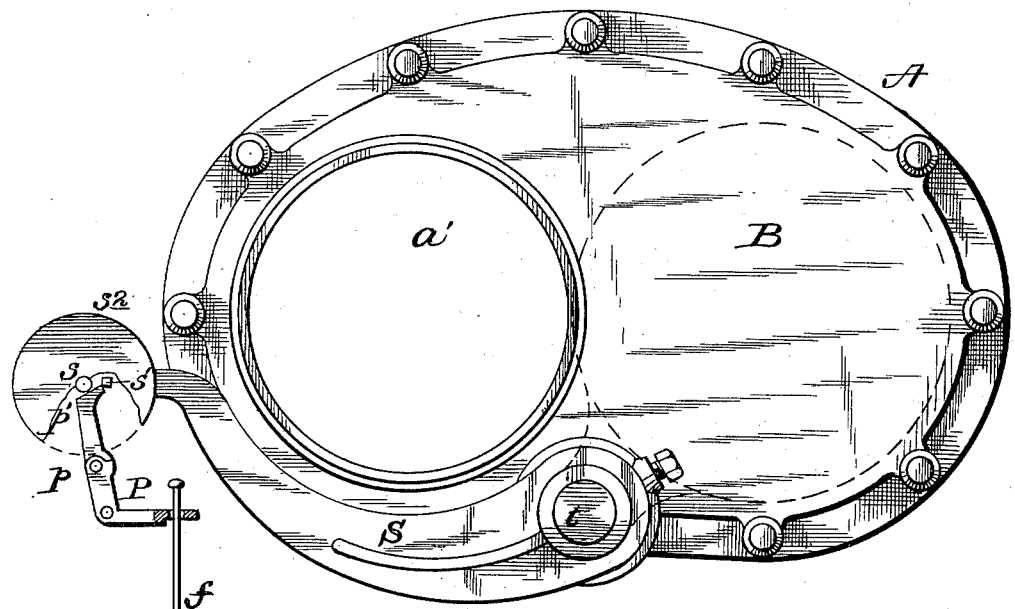
Fig. 6.
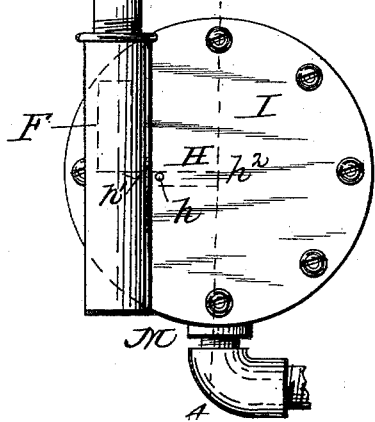
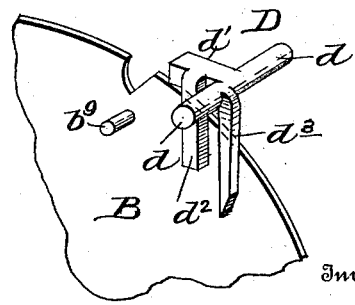
Witnesses  
Franck L. Ourand.  
George J. Weber.
Inventor  
Joseph McCreery,  
per W. H. Singleton.  
Attorney
THE NORRIS PETERS CO., PHOTO-LITHO., WASHINGTON, D. C.

UNITED STATES PATENT OFFICE.

JOSEPH McCREERY, OF TOLEDO, OHIO.

VENTILATOR-VALVE FOR SHIPS.

SPECIFICATION forming part of Letters Patent No. 592,531, dated October 26, 1897.

Application filed June 11, 1897. Serial No. 640,351. (No model.)

*To all whom it may concern:*

Be it known that I, JOSEPH MCCREERY, a citizen of the United States, residing at Toledo, in the State of Ohio, have invented certain new and useful Improvements in Valves to be Used in a System of Ventilation; and I do hereby declare the following to be a full, clear, and exact description of the invention, such as will enable others skilled in the art to which it appertains to make and use the same.

This invention relates to an improvement in valves to be used to close ventilating-openings in compartments of vessels.

In any system of ventilation where pipes pass through various compartments of a vessel or where there are ventilating-openings in the bulkheads of compartments should water flood any one compartment it would pass through the opening into the adjoining compartment and thus flood the entire vessel.

The object of the present invention is to provide an automatic valve which, operated upon by the flooding water, will close the venlattiing-opening, whether such opening be a hole in the bulkhead or be in a ventilating-pipe.

Figure 1:
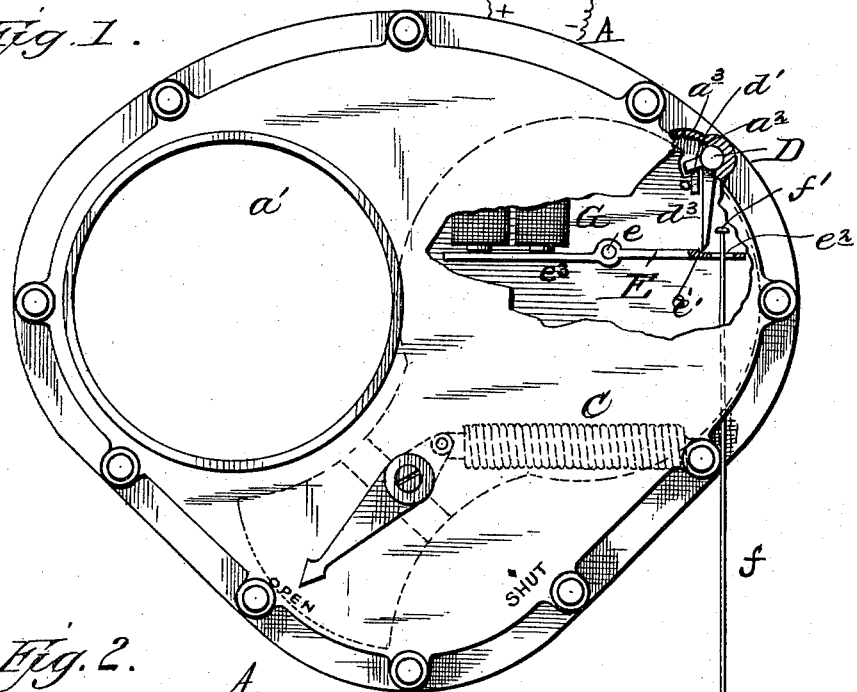
Figure 2:
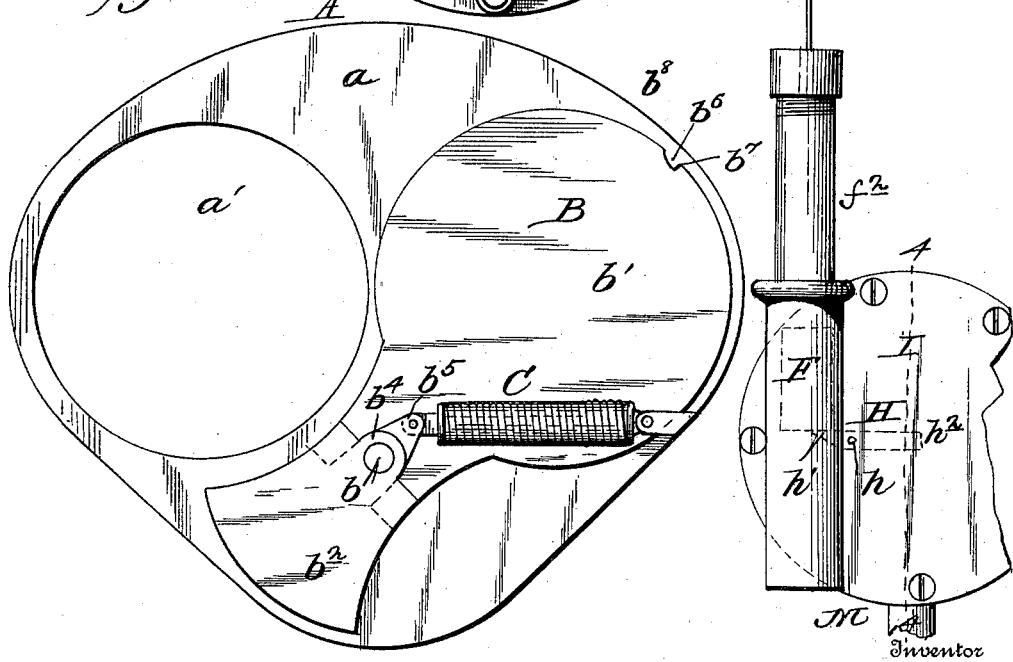

In the annexed drawings, Figure 1 represents an end view of the device, partly in section. Fig. 2 represents an interior view of the device. Fig. 3 represents an edge view. Fig. 4 represents a transverse section on the line 4 4, Fig. 1. Fig. 5 represents a modification. Fig. 6 represents an enlarged detail.

In the drawings the letter A represents a case consisting of two parts $a\ a$, bolted together, the case being hollow. At one side of the case there is a hole $a'$, which is intended to fit the opening in the bulkhead or through which a ventilating-pipe is to pass, the pipe being so arranged that the valve-shutter, hereinafter to be described, may be thrown across the pipe and effectually stop it. Within the case A the valve-shutter B is pivoted on the pin $b$. This valve-shutter B is made with a body portion $b'$, of a size and shape to fit the opening $a'$, and a counterbalancing tailpiece $b^2$. Projecting from the hub $b^4$ of the valve-shutter B is a stud $b^5$, to which is secured one end of a spring C, the other end of the spring being secured to the case A. This spring acts by extension, and when the valve-shutter B is free to move forces it across the hole $a'$. At its outer end the valve-shutter B is provided with a notch $b^6$, having the shoulder $b^7$ and the curve $b^8$. Pivoted in the edge of the case A is a dog D, its trunnions $d$ being journaled in the case A. This dog D is provided with a tongue $d'$, which is in the path of the valve-shutter B. Extending downwardly from one side of this dog $d'$ is a fin $d^2$, which is in the path of a stud $b^9$, extending from the face of the valve-shutter B. From the dog D there is a downward extension $d^3$. The recess $a^2$ of the case A, in which the dog D is journaled, has an enlargement $a^3$ just above the tongue $d'$. Pivoted within the case A on the pivot-pin $e$, to one side of the extension $d^3$, is a catch E. This catch E is provided with a shoulder $e'$, against which the lower end of the extension $d^3$ takes. At the outer end the catch E has an elongated hole $e^2$, through which passes a vertical rod $f$, having at its upper end a knob $f'$. The inner end $e^3$ of the catch E is formed as the armature of an electromagnet G, the wires of which pass off to a suitable source of electricity.

The rod $f$ passes down into a cylinder $f^2$ and is secured therein to a weight F. This weight F normally rests upon the top of a catch H, which is pivoted at $h$ within a case I, the case I and cylinder $f^2$ so communicating that the latch H may extend from the case into the cylinder. While the toe $h'$ of the latch H rests under the bottom of the weight F the heel $h^2$ of the latch is caught under a projection $k$, made in a curved plate K, secured within the case I. A reversely-curved elastic diaphragm L is also secured in the plate I, and a pin $l$, secured to the inner side of the diaphragm L, projects across the space between the diaphragm L and the plate K, and, passing loosely through a hole $k'$ in the plate K, bears against the heel $h^2$ of the catch H. The interior of the case I between the diaphragm L and the wall of the case is connected to a pipe M, provided with a suitable valve $m$. On the outside of the case A an indicator-finger is secured to the pin $b$, which extends outside of the case.

In the modification shown in Fig. 5 the rod $f$ is secured loosely to one side of a bell-crank lever P, the other end $p$ of this lever being made with a rule-joint. The upper end $p'$ of the lever P is made with a bevel which rests against a pin $s$, being held in proper relation by another pin $s'$ on the weighted end $s^2$ of a lever-arm S, which is secured on the outside to a pivot-pin $t$, to which is secured on the inside of the case A the valve-shutter B.

It has been said this device is put in place with the hole $a'$ around the ventilating-pipe or at the ventilating-opening in a bulkhead.

Should a compartment become flooded, water will pass through the pipe M into the case I, and pressure against the diaphragm L would push the pin $l$ against the latch H, forcing the toe $h'$ from under the weight F. The weight descending would pull the catch E away from the projection $d^3$. The spring C extending would force the valve-shutter B across the hole $a'$. As the valve-shutter is moved in this position the dog D would be turned, the tongue $d'$ being forced up into the enlargement $a^3$ of the recess $a^2$. When the valve-shutter B is open, the pin $b^9$, striking against the fin $d^2$, turns the dog D back into place, so that the tongue $d'$ engages the notch $b^6$ in the edge of the valve-shutter B.

In the modification shown in Fig. 5 the weight acts in the same way as in the form shown in the other figures. As the rod $f$ in that form descends the crank-lever P is turned and the rule-joint opening the incline $p'$ slides from under the pin $s$, thus allowing the weight $s^2$ to descend and to turn the valve-shutter across the opening $a'$.

In the form shown in Fig. 5 the electromagnetic device may be used to release the catch E by closing the circuit through the magnet.

Having described my invention, what I claim is—

1. A valve-shutter for a ventilating-opening hinged transversely to such opening, in combination with a lock for holding the valve-shutter open, a water-pressure mechanism and releasing mechanism between the lock and water-pressure mechanism to permit the closure of the shutter-valve, as set forth.

2. The combination of the case, A, having the hole, $a'$, at one side; the valve-shutter, B, pivoted within the case and having the peripheral notch, $b^6$; the dog, D, hinged in the edge of the case to engage such notch, the spring, C, fastened to the case and to the valve-shutter; the water-pressure mechanism and releasing mechanism between the last and the dog, as set forth.

3. The combination of the case, I, the pipe, M, leading into such case; the diaphragm, L, and plate, K, having the shoulder, $k$, and hole, $k'$, in such case; the pin, $l$, secured to the inner side of the diaphragm and passing through the plate-hole, $k'$, and bearing against the latch, H; the latch, H; the cylinder, $f^2$; the weight, F, in such cylinder; the latch, H, resting under the weight and the shoulder, $k$; the rod, $f$; the catch, E, connected to the upper end of the rod, $f$; the dog, D, held by the catch, E, and engaging a notch in the valve-shutter, B; the valve-shutter, B, having the notch, $b^6$, and pivoted in the case, A; with the spring, C, and such case, A, as set forth.

In testimony whereof I affix my signature in presence of two witnesses.

JOSEPH McCREERY.

Witnesses:
SAML. A. DRURY,
W. H. SINGLETON.